(12) United States Patent
Do

(10) Patent No.: US 11,884,297 B2
(45) Date of Patent: Jan. 30, 2024

(54) METHOD FOR AUTONOMOUSLY CONTROLLING A MOBILITY OF AN APPARATUS

(71) Applicant: Nissan Motor Co., Ltd., Yokohama (JP)

(72) Inventor: Anh Lam Do, Antony (FR)

(73) Assignee: Nissan Motor Co., Ltd., Yokohama (JP)

(*) Notice: Subject to any disclaimer, the term of this patent is extended or adjusted under 35 U.S.C. 154(b) by 252 days.

(21) Appl. No.: 17/438,223

(22) PCT Filed: Feb. 4, 2020

(86) PCT No.: PCT/EP2020/052705
§ 371 (c)(1),
(2) Date: Sep. 10, 2021

(87) PCT Pub. No.: WO2020/182373
PCT Pub. Date: Sep. 17, 2020

(65) Prior Publication Data
US 2022/0185327 A1 Jun. 16, 2022

(30) Foreign Application Priority Data
Mar. 13, 2019 (FR) ..................... 1902587

(51) Int. Cl.
*B60W 60/00* (2020.01)
*B60W 30/09* (2012.01)
*B60W 50/00* (2006.01)

(52) U.S. Cl.
CPC ........ *B60W 60/0015* (2020.02); *B60W 30/09* (2013.01); *B60W 50/0098* (2013.01); *B60W 2050/0031* (2013.01); *B60W 2520/06* (2013.01); *B60W 2520/14* (2013.01)

(58) Field of Classification Search
CPC ............. B60W 60/0015; B60W 30/09; B60W 50/0098; B60W 2050/0031; B60W 2520/06; B60W 2520/14; B60W 2050/0033; B60W 2050/0042; B60W 2420/40; B60W 2420/62; B60W 2540/18;
(Continued)

(56) References Cited

U.S. PATENT DOCUMENTS

2009/0319128 A1* 12/2009 Lauer .................... B60W 50/16
701/42
2017/0106903 A1* 4/2017 Moretti ................ B62D 15/025
2018/0134309 A1* 5/2018 Moulaire ............. B62D 5/0463

OTHER PUBLICATIONS

Li Li et al. "An LMI approach to robust vehicle steering controller design" 2005 IEEE Intelligent Transportation Systems Conference (ITSC); Vienna, Austria; Sep. 13-16, 2005, EEE, Piscataway, NJ, USA, Sep. 13, 2005 (Sep. 13, 2005), pp. 360-365.

* cited by examiner

*Primary Examiner* — Jason Holloway
(74) *Attorney, Agent, or Firm* — Young Basile Hanlon & MacFarlane, P.C.

(57) ABSTRACT

A method autonomously controls a mobility of an automotive apparatus, which mobility is such as to have an influence on the path of the apparatus. The method includes steps of: acquiring parameters relative to the path of the apparatus, and of computing a new control setpoint for the mobility of the apparatus depending on said parameters, this new control setpoint being determined by means of a controller that respects a model that limits the variation in the control setpoint.

6 Claims, 2 Drawing Sheets

(58) Field of Classification Search
CPC ....... B60W 2710/18; B60W 2710/205; B60W 2710/207

See application file for complete search history.

METHOD FOR AUTONOMOUSLY CONTROLLING A MOBILITY OF AN APPARATUS

CROSS-REFERENCE TO RELATED APPLICATION(S)

This application claims priority to French Patent Application Serial No. 1902587, filed Mar. 13, 2019, the entire disclosure of which is hereby incorporated by reference.

TECHNICAL FIELD

The present invention generally relates to the automation of the trajectory following ability of automotive apparatuses.

It has a particularly advantageous application within the context of driver assistance systems for motor vehicles, but it also can be applied in the field of aeronautics or of robotics.

It more particularly relates to a method for autonomously controlling a movement (i.e. a trajectory control component) of an automotive apparatus, comprising steps of:
acquiring parameters relating to a trajectory of the apparatus; and
computing a new control setpoint of the movement of the apparatus as a function of said parameters.

It also relates to an apparatus equipped with a computer adapted to implement this method.

BACKGROUND

To ensure the safety of motor vehicles, said vehicles are currently equipped with driver assistance systems or with autonomous driving systems.

Among these systems, the Automatic Emergency Braking (AEB) systems are particularly known, which are designed to avoid any collision with obstacles located in the path taken by the vehicle, simply by acting on the conventional braking system of the motor vehicle.

However, situations exist in which these emergency braking systems do not allow a collision to be avoided or cannot be used (for example, if an appliance closely follows the motor vehicle).

For these situations, automatic avoidance systems have been developed, better known as Automatic Evasive Steering or Automatic Emergency Steering (AES) systems, that allow the obstacle to be avoided by diverting the vehicle from its trajectory, either by acting on the steering of the vehicle or by acting on the differential braking of the vehicle.

However, sometimes the AES system imposes a limited trajectory on the vehicle that is limited in terms of controllability, which does not allow the driver to safely regain driving control of the vehicle.

SUMMARY

In order to overcome the aforementioned disadvantage of the prior art, the present invention proposes using a controller adapted to establish a control setpoint that limits the speed of the change of direction imposed on the automotive apparatus.

More particularly, according to the invention a method is proposed for autonomously controlling a movement of an automotive apparatus that is adapted to influence the trajectory of said apparatus, the method comprising steps of:
acquiring parameters relating to the trajectory of the apparatus; and
computing a new control setpoint of the movement of the apparatus as a function of said parameters, this new control setpoint being determined by means of a controller that respects a model that limits the variation of the control setpoint.

Thus, by virtue of the invention, the control setpoint is natively determined to restrict the speed of variation of the considered movement.

Preferably, the apparatus is a motor vehicle that is adapted for driving on roads and that comprises at least one guiding wheel, said movement corresponds to the ability of each guiding wheel to turn, and the control setpoint is a saturated turning angle setpoint of each guiding wheel.

In this particular case, the turning angle is therefore computed directly so as not to be able to vary too quickly, which allows the driver of the vehicle to be able to safely regain driving control of the vehicle and which prevents the trajectory following abilities of the vehicle from being exceeded.

The invention is particularly applicable when the trajectory of the vehicle is a trajectory for avoiding an obstacle located on the road taken by the vehicle. In this particular case, the vehicle must react quickly and safely, by following the desired trajectory with a short response time.

Other advantageous and non-limiting features of the method according to the invention, taken individually or according to all the technically possible combinations, are as follows:
provision is made for determining an unsaturated turning angle setpoint that does not respect said limiting model, and wherein the limiting model comprises a hyperbolic tangent function of the deviation between the unsaturated turning angle setpoint and the saturated turning angle setpoint;
provision is made for comparing a value computed using said hyperbolic tangent function with a predetermined threshold and, depending on the result of said comparison, continuing or interrupting said method;
said value is computed using the mathematical expression:

$$\theta = \frac{\tanh(\alpha(\delta_K - \delta_{ref}))}{\alpha(\delta_K - \delta_{ref})},$$

where $\alpha$ is a predetermined constant;
$\delta_K$ is the unsaturated turning angle setpoint; and $\delta_{ref}$ is the saturated turning angle setpoint;
the parameters comprise at least one yaw rate r of the apparatus and/or a relative heading angle $\Psi_L$ between the longitudinal axis of the apparatus and a tangent to the trajectory.

The invention also relates to method for developing a controller with a view to its use in a control method as described above, wherein provision is made for:
acquiring a behavioral matrix model of the apparatus;
determining at least some of the coefficients of the matrices of the behavioral matrix model;
deducing a controller that, on the one hand, respects following a trajectory to be taken and, on the other hand, a model that limits the variation of a control setpoint.

Preferably then, the controller is determined on the basis of convex optimization criteria under constraints of linear matrix inequalities.

The invention also relates to an automotive apparatus comprising at least one movement that is adapted to influence the trajectory of said apparatus, an actuator for controlling said movement, and a computer for controlling said actuator, which computer is adapted to implement a method as described above.

Advantageously then, this apparatus is formed by a motor vehicle adapted for driving on roads and comprising at least one guiding wheel, said movement then corresponding to the ability of each guiding wheel to turn.

Of course, the various features, variants and embodiments of the invention can be associated with each other according to various combinations, insofar as they are not incompatible or mutually exclusive.

BRIEF DESCRIPTION OF THE DRAWINGS

The following description, which is provided with reference to the accompanying drawings, which are provided by way of non-limiting examples, will explain what the invention entails and how it can be produced.

In the accompanying drawings.

DETAILED DESCRIPTION

Figure 1:
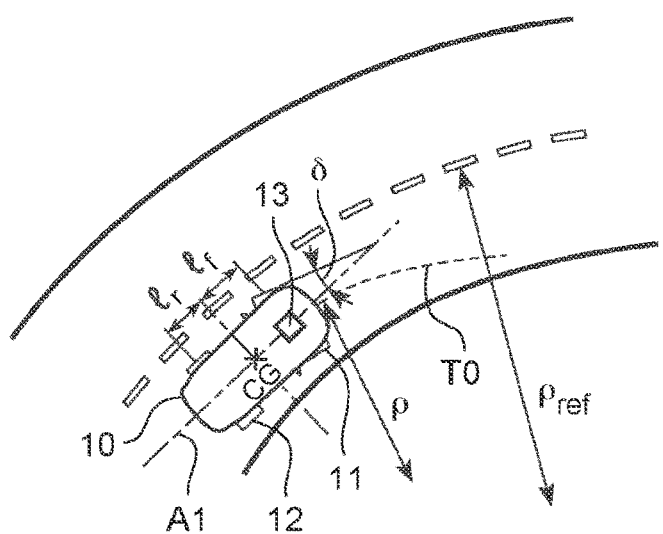
FIG. 1 is a schematic top view of a motor vehicle travelling on a road, which figure shows the trajectory that must be taken by this vehicle.

FIG. 1 shows a motor vehicle 10 conventionally comprising a chassis that defines a passenger compartment, two front guiding wheels 11, and two rear non-guiding wheels 12. By way of a variant, these two rear wheels also could be guiding wheels.

This motor vehicle 10 comprises a conventional steering system that is able to act on the orientation of the front wheels 11 so as to be able to turn the vehicle. This conventional steering system particularly comprises a steering wheel connected to connecting rods in order to pivot the front wheels 11. In the considered example, it also comprises an actuator for acting on the orientation of the front wheels as a function of the orientation of the steering wheel and/or as a function of a request received from a computer 13.

In addition, this motor vehicle optionally can be arranged to comprise a differential braking system allowing the speeds of rotation of the front wheels 11 (and those of the rear wheels 12) to be acted on differently so as to slow down the motor vehicle by making it turn. This differential braking system comprises, for example, a controlled differential or electric motors placed on the wheels of the vehicle.

Throughout the remainder of this description, the considered steering system will be formed by the conventional steering system alone. By way of a variant, it could be formed by the combination of the conventional steering system and of the differential braking system.

The computer 13 is then designed to control the assisted steering actuator. To this end, it comprises at least one processor, at least one memory and various input and output interfaces.

By virtue of its input interfaces, the computer 13 is adapted to receive input signals originating from different sensors.

Figure 2:
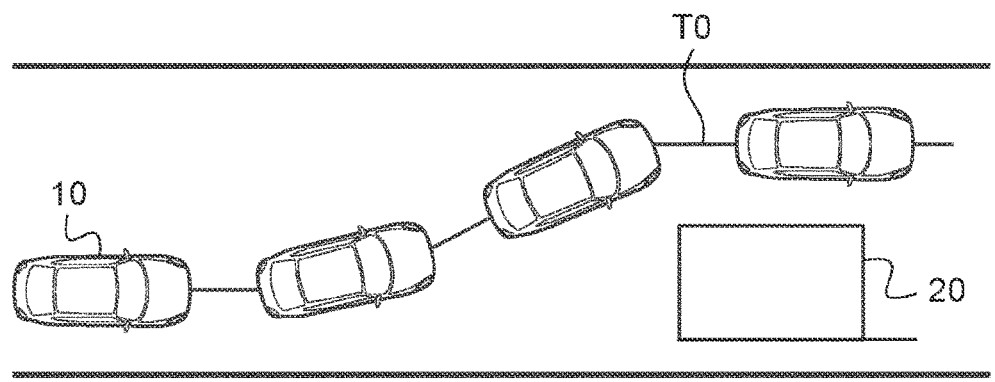
FIG. 2 is a schematic perspective view of the motor vehicle of FIG. 1, shown in four successive positions located along a trajectory for avoiding an obstacle.

Among these sensors, the following is provided, for example:
- a device, such as a front camera, allowing the position of the vehicle to be identified in relation to its traffic lane;
- a device, such as a RADAR or LIDAR remote sensor, allowing an obstacle 20 to be detected that is located on the trajectory of the motor vehicle 10 (FIG. 2);
- a device, such as a gyrometer, allowing the yaw rotation rate (about a vertical axis) of the motor vehicle 10 to be determined; and
- a sensor for the position and the angular speed of the steering wheel.

By virtue of its output interfaces, the computer 13 is adapted to transmit a setpoint to the assisted steering actuator.

It thus allows the vehicle to be forced to follow a trajectory T0 for avoiding the obstacle 20.

By virtue of its memory, the computer 13 stores data used within the scope of the method described hereafter.

It particularly stores a computer application, which is made up of computer programs comprising instructions, the execution of which by the processor allows the computer to implement the method described hereafter.

Before describing this method, the various variables that will be used can be introduced, some of which are illustrated in FIG. 1.

The total weight of the motor vehicle will be denoted "m" and will be expressed in kg.

The inertia of the motor vehicle about a vertical axis passing through its center of gravity CG will be denoted "J" and will be expressed in N·m.

The distance between the center of gravity CG and the front axle of the vehicle will be denoted "$l_f$" and will be expressed in meters.

The distance between the center of gravity CG and the rear axle will be denoted "$l_r$" and will be expressed in meters.

The drift stiffness coefficient of the front wheels will be denoted "$C_f$" and will be expressed in N/rad.

The drift stiffness coefficient of the rear wheels will be denoted "$C_r$" and will be expressed in N/rad.

These drift stiffness coefficients of the wheels are notions that are well known to a person skilled in the art. By way of an example, the drift stiffness coefficient of the front wheels is thus that which allows the equation $F_f = 2 \cdot C_f \cdot \alpha_f$ to be written, with $F_f$ being the lateral sliding force of the front wheels and $\alpha_f$ being the drift angle of the front wheels.

The turning angle that the front guiding wheels make with the longitudinal axis A1 of the motor vehicle 10 will be denoted "$\delta$" and will be expressed in rad.

The variable $\delta_{ref}$, expressed in rad, will denote the saturated turning angle setpoint, as it will be transmitted to the assisted steering actuator.

The variable $\delta_K$, expressed in rad, will denote the unsaturated turning angle setpoint. At this stage, it is only possible to specify that the saturation concept will be associated with a turning speed limit that will not necessarily be followed with the variable $\delta_K$, but that will be followed with the variable $\delta_{ref}$.

The yaw rate of the vehicle (about the vertical axis passing through its center of gravity CG) will be denoted "r" and will be expressed in rad/s.

The relative heading angle between the longitudinal axis A1 of the vehicle and the tangent to the avoidance trajectory T0 (desired trajectory of the vehicle) will be denoted "$\Psi_L$" and will be expressed in rad.

The lateral deviation between the longitudinal axis A1 of the motor vehicle 10 (passing through the center of gravity CG) and the avoidance trajectory T0, at a targeted distance "ls" located in front of the vehicle, will be denoted "$y_L$" and will be expressed in meters.

The lateral deviation setpoint between the longitudinal axis A1 of the motor vehicle 10 (passing through the center of gravity CG) and the avoidance trajectory T0, at a targeted distance "ls" located in front of the vehicle, will be denoted "$y_{L\text{-}ref}$" and will be expressed in meters.

The trajectory following error will be denoted "$e_{yL}$" and will be expressed in meters. It will be equal to the deviation between the lateral deviation setpoint $y_{L\text{-}ref}$ and the lateral deviation $y_L$.

The aforementioned targeted distance "ls" will be measured from the center of gravity CG and will be expressed in meters.

The drift angle of the motor vehicle 10 (angle that the speed vector of the motor vehicle makes with its longitudinal axis A1) will be denoted "$\delta$" and will be expressed in rad.

The speed of the motor vehicle along the longitudinal axis A1 will be denoted "V" and will be expressed in m/s.

P and Q will be suitable, positive and symmetrical matrices of dimensions, such that $Q=P^{-1}$. The exact expression of these matrices will become more clearly apparent from reading the remainder of this description.

The constants $\xi$ and $\omega$ will represent dynamic features of the turning angle of the front wheels of the vehicle.

The constant $\omega_f$ for its part will represent a dynamic feature of a limited random disruption w applied to the vehicle.

Before describing the method that will be executed by the computer in order to implement the invention, a first part of this disclosure will describe the computations that allowed the invention to be achieved, in order to fully understand the origin of these computations and the domains on which they rely.

In this case, it will be considered that the dynamic behavior of the vehicle can be modelled by means of the following equation:

[Math 1]

$$\begin{pmatrix} \dot{\beta} \\ \dot{r} \\ \dot{\psi}_L \\ \dot{e}_{y_L} \\ \ddot{\delta} \\ \dot{\delta} \\ \dot{y}_{L\_ref} \end{pmatrix} = \begin{bmatrix} -\dfrac{C_f + C_r}{mV} & 1 + \dfrac{C_r l_r - C_f l_f}{mV^2} & 0 & 0 & 0 & \dfrac{C_f}{mV} & 0 \\ -\dfrac{C_f l_f - C_r l_r}{J} & -\dfrac{C_r l_r^2 - C_f l_f^2}{JV} & 0 & 0 & 0 & \dfrac{C_f l_f}{J} & 0 \\ 0 & 1 & 0 & 0 & 0 & 0 & 0 \\ V & l_y & V & 0 & 0 & 0 & -1 \\ 0 & 0 & 0 & 0 & -2\xi\omega & -\omega^2 & 0 \\ 0 & 0 & 0 & 0 & 1 & 0 & 0 \\ 0 & 0 & 0 & 0 & 0 & 0 & -\omega_f \end{bmatrix} \begin{pmatrix} \beta \\ r \\ \psi_L \\ e_{y_L} \\ \dot{\delta} \\ \delta \\ y_{L\_ref} \end{pmatrix} + \begin{bmatrix} 0 \\ 0 \\ 0 \\ 0 \\ \omega^2 \\ 0 \\ 0 \end{bmatrix} \delta_{ref} + \begin{bmatrix} 0 \\ 0 \\ 0 \\ 0 \\ 0 \\ 0 \\ \omega_f \end{bmatrix} w$$

This model is an improved bicycle model.

However, it does not allow the turning speed of the front wheels 11 of the vehicle to be limited. However, such a limitation proves to be particularly important for ensuring that the driver of the vehicle is capable of regaining the control of the vehicle at any time.

Such a limitation can be expressed using the following equation:

$$|\dot{\delta}_{ref}| \leq v.$$ [Math 2]

In this equation, the coefficient v is a constant that represents the turning speed that must not be exceeded. This constant is defined either by computation, or following the completion of a test campaign conducted on a test vehicle.

According to the invention, the intention is to limit the turning speed of the guiding wheels 11 not by imposing a severe threshold, but rather by using a setpoint variation limiter (better known as a "rate limiter").

Figure 4:
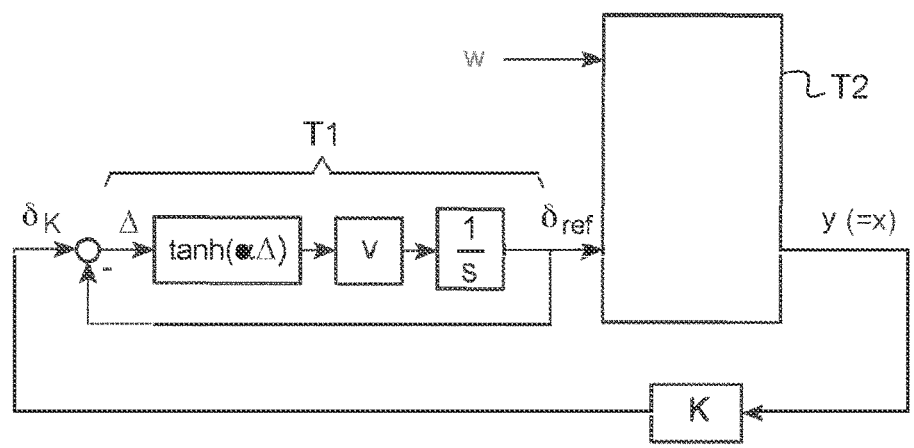
FIG. 4 is a diagram illustrating the closed loop transfer function used to control the motor vehicle.
Figure 5:
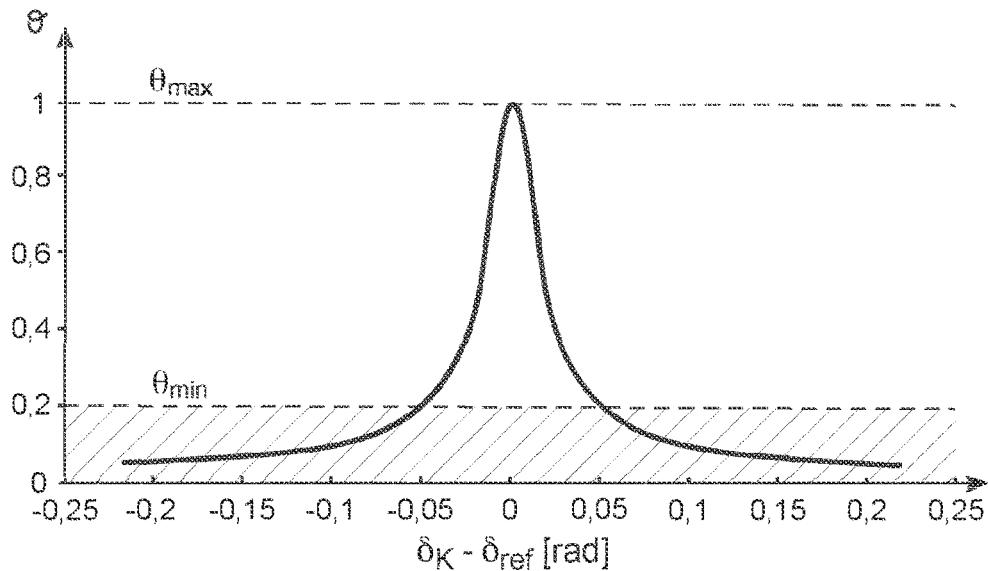
FIG. 5 is a graph illustrating the variations of a function $\theta$ used to control the motor vehicle.
Figure 6:
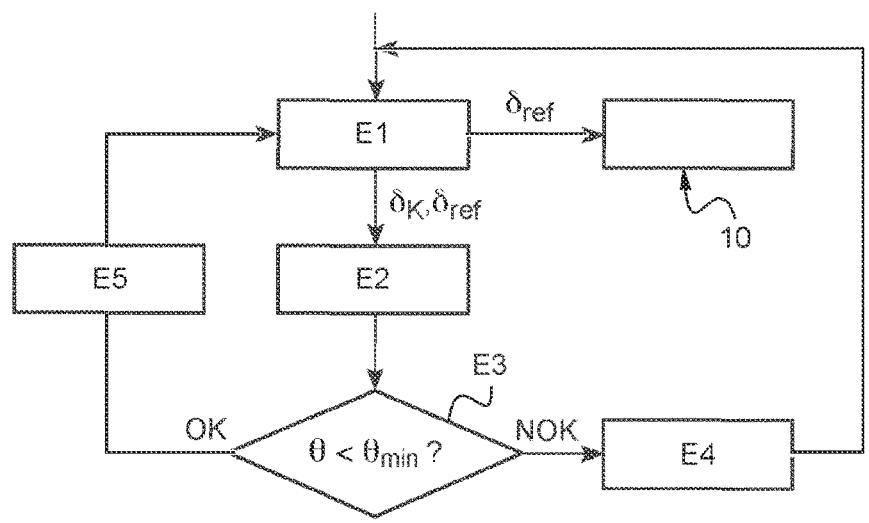
FIG. 6 is a graph illustrating an algorithm for controlling the vehicle using a method according to the invention.

As shown in FIG. 4, this setpoint variation limiter T1 in this case is particular in this respect in that it operates in a closed loop and it has a v/s transfer function and a corrector that is a hyperbolic tangent function. It receives the unsaturated turning angle setpoint $\delta_K$ as input and transmits the saturated turning angle setpoint $\delta_{ref}$ as output.

In this figure, the coefficient $\Delta$ corresponds to the deviation between the variables $\delta_{ref}$ and $\delta_K$. The coefficient $\alpha$ is a constant ranging between 0 and infinity, which is the only parameter able to act on the rapid or flexible nature of the setpoint variation limiter T1.

Figure 3:
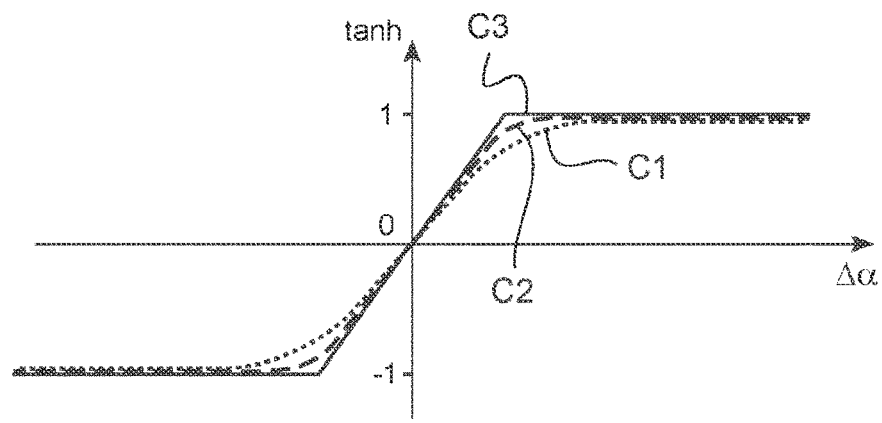
FIG. 3 is a graph illustrating the variations of a hyperbolic tangent function.

As shown in FIG. 3, the use of such a corrector not only allows the variations in the turning angle to be limited, but also ensures a continuity in the variation of the saturated turning angle setpoint $\delta_{ref}$.

The curve C1 thus shows that this setpoint variation can be smooth and flexible (with a low coefficient $\alpha$), or faster, as shown by the curve C2 (the curve C3 corresponds to an infinite coefficient $\alpha$).

The advantage of this setpoint variation limiter T1 is that it is simple to set up since only the coefficient $\alpha$ needs to be adjusted. It allows continuous and smooth (infinitely differentiable) control to be provided. Above all, it can be directly taken into account in the dynamic behavioral model of the vehicle defined by the equation Math 1, with a view to computing a turning angle setpoint of the vehicle.

To this end, in view of the form of this setpoint variation limiter T1, the following can be written:

$$\dot{\delta}_{ref} = v \cdot \tan h(\alpha(\delta_K - \delta_{ref})). \qquad \text{[Math 3]}$$

This equation also can be written as follows:

$$\dot{\delta}_{ref} = v \frac{\tanh(\alpha(\delta_K - \delta_{ref}))}{\alpha(\delta_K - \delta_{ref})} \alpha(\delta_K - \delta_{ref}). \qquad \text{[Math 4]}$$

The following parameter $\theta$ then can be introduced:

$$\theta = \frac{\tanh(\alpha(\delta_K - \delta_{ref}))}{\alpha(\delta_K - \delta_{ref})}. \qquad \text{[Math 5]}$$

Then the equation Math 4 can be re-written as follows:

$$\dot{\delta}_{ref} = -v \cdot \alpha \cdot \theta \cdot \delta_{ref} + v \cdot \alpha \cdot \theta \cdot \delta_K \qquad \text{[Math 6]}$$

This equation Math 6 is characteristic of a state representation and it shows that the setpoint variation limiter model T1 is linear as a function of the parameter $\theta$.

It is then possible to enhance the bicycle model of the equation Math 1 with this state representation in order to obtain a new model that is written as follows:

[Math 7]

$$\begin{pmatrix} \dot{\beta} \\ \dot{r} \\ \dot{\psi}_L \\ \dot{e}_{y_L} \\ \ddot{\delta} \\ \dot{\delta} \\ \dot{y}_{L\_ref} \\ \dot{\delta}_{ref} \end{pmatrix} = \begin{bmatrix} -\frac{C_f + C_r}{mV} & 1 + \frac{C_r l_r - C_f l_f}{mV^2} & 0 & 0 & 0 & \frac{C_f}{mV} & 0 & 0 \\ -\frac{C_f l_f - C_r l_r}{J} & -\frac{C_r l_r^2 - C_f l_f^2}{JV} & 0 & 0 & 0 & \frac{C_f l_f}{J} & 0 & 0 \\ 0 & 1 & 0 & 0 & 0 & 0 & 0 & 0 \\ V & l_y & V & 0 & 0 & 0 & -1 & 0 \\ 0 & 0 & 0 & 0 & -2\xi\omega & -\omega^2 & 0 & \omega^2 \\ 0 & 0 & 0 & 0 & 1 & 0 & 0 & 0 \\ 0 & 0 & 0 & 0 & 0 & 0 & -\omega_f & 0 \\ 0 & 0 & 0 & 0 & 0 & 0 & 0 & -v\alpha\theta \end{bmatrix} \begin{pmatrix} \beta \\ r \\ \psi_L \\ e_{y_L} \\ \dot{\delta} \\ \delta \\ y_{L\_ref} \\ \delta_{ref} \end{pmatrix} + \begin{bmatrix} 0 \\ 0 \\ 0 \\ 0 \\ 0 \\ 0 \\ 0 \\ v\alpha\theta \end{bmatrix} \delta_K + \begin{bmatrix} 0 \\ 0 \\ 0 \\ 0 \\ 0 \\ 0 \\ \omega_f \\ 0 \end{bmatrix} w.$$

FIG. 4 shows, in the form of a closed loop, the behavioral model of the vehicle, where T2 represents the model of the vehicle provided by the equation Math 1.

In this loop, this model T2 receives as input the saturated turning angle setpoint $\delta_{ref}$ and the disruptions w.

Based on this model T2, and by virtue of the measurement results provided by the sensors, it is possible to obtain an output vector y, which in this case is considered to be equal to a state vector x that can be written as follows:

$$x = (\beta\ r\Psi_L\ e_{yL}\ \dot{\delta}\ \delta\ \dot{y}_{L\_ref} \delta_{ref})^T.$$

FIG. 4 also shows the setpoint variation limiter T1.

The aim is to then determine the form of the controller K, which is the state feedback law allowing the unsaturated turning angle setpoint $\delta_K$ to be computed on the basis of this state vector x.

In order to understand how to determine a controller K that is suitable both in terms of stability and of rapidity, the behavioral model can be generically written as:

$$\begin{cases} \dot{x} = A(\theta)x + B_u(\theta)\delta_{ref} + B_w w \\ y = C_y x \end{cases} \quad [\text{Math 8}]$$

In this equation, $C_y$ is the identity matrix, A is a dynamic matrix, $B_u$ is a control matrix, and $B_w$ is a disruption matrix, that can be written as follows:

$$A = \begin{bmatrix} -\dfrac{C_f + C_r}{mV} & 1 + \dfrac{C_r l_r - C_f l_f}{mV^2} & 0 & 0 & 0 & \dfrac{C_f}{mV} & 0 & 0 \\ -\dfrac{C_f l_f - C_r l_r}{J} & -\dfrac{C_r l_r^2 - C_f l_f^2}{JV} & 0 & 0 & 0 & \dfrac{C_f l_f}{J} & 0 & 0 \\ 0 & 1 & 0 & 0 & 0 & 0 & 0 & 0 \\ V & l_s & V & 0 & 0 & 0 & -1 & 0 \\ 0 & 0 & 0 & 0 & -2\xi\omega & -\omega^2 & 0 & \omega^2 \\ 0 & 0 & 0 & 0 & 1 & 0 & 0 & 0 \\ 0 & 0 & 0 & 0 & 0 & 0 & -\omega_f & 0 \\ 0 & 0 & 0 & 0 & 0 & 0 & 0 & -v\alpha\theta \end{bmatrix}, \quad [\text{Math 9}]$$

$$B_u = \begin{bmatrix} 0 \\ 0 \\ 0 \\ 0 \\ 0 \\ 0 \\ 0 \\ v\alpha\theta \end{bmatrix}, \quad B_w = \begin{bmatrix} 0 \\ 0 \\ 0 \\ 0 \\ 0 \\ 0 \\ \omega_f \\ 0 \end{bmatrix}.$$

The controller K, which is defined as a static state feedback law, for its part can be expressed as follows:

$$\delta_K = Kx. \quad [\text{Math 10}]$$

In order to find an optimal controller K, various methods can be used.

The method used in this case is that of linear matrix inequalities. It is thus produced on the basis of convex optimization criteria under constraints of linear matrix inequalities.

More specifically, the aim is to optimize the gains of the closed loop defined by the controller K by adjusting the selection of the poles.

Three matrix inequations are used and they are defined by the following inequations:

$$A_i Q + B_i R + (A_i Q + B_i R)^T + 2\mu Q < 0; \quad [\text{Math 11}]$$

$$\begin{bmatrix} -\gamma Q & A_i Q + B_i R \\ * & -\gamma Q \end{bmatrix} < 0; \quad [\text{Math 12}]$$

-continued $$\begin{bmatrix} \sin(\varphi) & \cos(\varphi) \\ (A_iQ + B_iR + (A_iQ + B_iR)^T) & (A_iQ + B_iR - (A_iQ + B_iR)^T) \\ & \sin(\varphi) \\ * & (A_iQ + B_iR + (A_iQ + B_iR)^T) \end{bmatrix} < 0.$$

[Math 13]

In these inequations, the index i is equal to 1 or 2, and the matrices $A_i$ and $B_i$ then can be defined as follows:

$$A_1 = A(\theta_{min}),$$

$$A_2 = A(\theta_{max}),$$

$$B_1 = B_u(\theta_{min}),$$

$$B_2 = B_u(\theta_{max}).$$

A matrix in the form $$\begin{bmatrix} X & Y \\ Y^T & W \end{bmatrix}$$

is written in the form $$\begin{bmatrix} X & Y \\ * & W \end{bmatrix}.$$

The controller K is defined by the following equation:

$$K = RQ^{-1}.$$ [Math 14]

The speed of the vehicle is assumed to be constant (therefore all the matrices of the system are considered to be constant).

The three inequations ensure that the closed loop dynamic remains limited. Indeed, by virtue of these constraints, the poles of the closed loop are limited in a defined zone by a radius y, a minimum distance relative to the imaginary axis and an aperture angle (p.

This method proves to be effective when it involves determining, at each instant, the steering wheel angle in a reasonable manner (and in a manner that can be controlled by a driver with average skills) and in a manner that can be achieved by the actuator. These constraints also ensure the stability of the closed loop.

In this case, the aim is to minimize the radius y. Once the controller K is obtained, it is possible to compute the unsaturated turning angle setpoint by means of the following formula:

$$\delta_K = Kx = \begin{bmatrix} k_\beta & k_r & k_{\psi_L} & k_{e_{y_L}} & k_{\dot{\delta}} & k_\delta & k_{\dot{y}_{L\_ref}} & k_{\delta_{ref}} \end{bmatrix} \begin{pmatrix} \beta \\ r \\ \psi_L \\ e_{y_L} \\ \dot{\delta} \\ \delta \\ \dot{y}_{L\_ref} \\ \delta_{ref} \end{pmatrix}.$$ [Math 15]

The values $\theta_{min}$ and $\theta_{max}$ have been introduced into the three matrix inequations.

The value of θ, which is associated with the deviation between $\delta_K$ and $\delta_{ref}$ (see equation Math 5), reflects the level of infringement by the controller K of the controllability limit stipulated by the equation Math 2.

By definition, θ ranges between 0 (exclusive) and 1 (inclusive). When θ equals 1, the computed unsaturated angle setpoint $\delta_K$ of the steering wheel complies with the controllability limit. When it is close to 0, the computed unsaturated angle setpoint $\delta_K$ of the steering wheel has a value that imposes an excessive turning dynamic, which generates a risk of instability of the vehicle. When θ assumes intermediate values between 0 and 1, the controllability limit is not followed, but it is possible that there is no risk of instability of the vehicle.

In other words, the selection of the values $\delta_{min}$ and $\theta_{max}$ has a direct impact on the performance and on the robustness of the controller K. The wider the range $[\theta_{min}, \theta_{max}]$, the lower the performance but the greater the robustness of the controller K. On the contrary, the narrower this range, the greater the performance but the lower the robustness of the controller K.

Logically, the value $\theta_{max}$ is selected to be equal to 1 (which is the case whereby the controller K operates in a linear mode, as is also generally the case, without infringement of the controllability constraint).

Determining the value $\theta_{min}$ nevertheless requires reaching a compromise between performance and robustness. Determining this value involves imposing a maximum threshold for the difference, as an absolute value, between $\delta_K$ and $\delta_{ref}$ (see equation Math 5).

In order to properly illustrate this selection, FIG. 4 shows the variation of the value of θ as a function of the deviation between $\delta_K$ and $\delta_{ref}$. In this example, the value $\theta_{min}$ has been selected as being equal to 0.2.

To summarize, the method for computing the controller K that is suitable for a particular model of a motor vehicle involves setting values of v, α, $\theta_{min}$ and $\theta_{max}$.

It subsequently involves determining the coefficients of the matrices $A_i$, $B_i$, then solving the equations Math 11 to Math 13 in order to deduce a controller K therefrom that ensures that the avoidance trajectory T0 is properly followed and that respects the model that limits the variation in the setpoint.

This controller K then can be implemented in the computers 13 of the motor vehicles 10 of the range.

At this point, the method can be described that will be executed by the computer 13 of one of these motor vehicles in order to implement the invention.

In this case, the computer is programmed to implement this method in a recursive manner, i.e. step-by-step, and as a loop.

To this end, during a first step, the computer 13 attempts to detect the presence of a possible obstacle located on the path of the motor vehicle 10. To this end, it uses a RADAR or LIDAR remote sensor.

In the absence of an obstacle, this step is repeated in loops.

As soon as an obstacle 20 is detected (see FIG. 2), the computer 13 plans an avoidance trajectory T0 allowing this obstacle 20 to be avoided.

The computer 13 will then attempt to define a control setpoint for the conventional steering system 14, namely a saturated turning angle setpoint $\delta_{ref}$ allowing this avoidance trajectory T0 to be followed as closely as possible.

To this end, it begins by computing or measuring the parameters, namely:
the measured turning angle $\delta$;
the drift of the measured turning angle $\delta$ over time;
the saturated turning angle setpoint $\delta_{ref}$ obtained during the previous time period;
the yaw rate r;
the relative heading angle $\Psi_L$;
the drift of the lateral deviation setpoint $y_{L\text{-}ref}$ over time;
the trajectory following error $e_{yL}$;
the drift angle $\beta$.

The computer 13 subsequently uses the controller K stored in its memory. This controller K will therefore enable, during a first step E1, the values of the unsaturated $\delta_K$ and saturated $\delta_{ref}$ turning angle setpoints to be determined.

The saturated turning angle setpoint $\delta_{ref}$ will then be transmitted to the actuator allowing the wheels of the motor vehicle 10 to be turned.

Then, during a second step E2, the computer 13 determines the value of $\theta$, by means of the equation Math 5. It is generally equal to 1 or close to 1. However, when disruptions are present it nevertheless may deviate from this value.

Then, during a step E3, the computer 13 checks that the value of $\theta$ is much higher than the threshold $\theta_{min}$ that has been set and that is therefore recorded as a constant in its memory.

If this is the case, during a step E4, the computer decides to maintain the process of controlling the turning of the vehicle in order to avoid the obstacle 20.

Otherwise, during a step E5, the computer decides to suspend the process of controlling the turning of the vehicle. Then, it can be envisioned that the vehicle performs an emergency stop and/or that it resumes the process of controlling the turning of the vehicle as soon as the stability conditions are met once again.

This case can particularly occur in the presence of anomalies (failure of the sensors, of the assisted steering system, behaviors of the vehicle and/or of the driver that cannot be managed by the controller K, etc.). Thus, the invention also allows a possible failure of a sensor to be detected.

The present invention is by no means limited to the embodiment that has been described and shown, but a person skilled in the art will know how to add any alternative embodiment according to the invention.

Thus, the method can be applied to other types of fields in which a particular trajectory must be followed, for example, in aeronautics or in robotics (in particular when the robot is small and that one of its commands must be saturated).

A hyperbolic tangent function is understood to be the various functions having a form that is close to the hyperbolic tangent, which particularly includes the inverse trigonometric functions (such as arctangent), the error function (commonly denoted erf), the Gudermannian function (commonly denoted gd) and the hyperbolic trigonometric function (such as the hyperbolic tangent).

As already mentioned, the threshold $\theta_{min}$ is strictly less than the threshold $\theta_{max}$, so that the flexible saturation condition can be implemented since a range of several values ranging between $\theta_{min}$ and $\theta_{max}$ exists. This flexible saturation condition means that the controller K tolerates exceeding the saturation constraint, whilst guaranteeing the stability of the system in a closed loop, which allows better performance to be obtained. Indeed, the unsaturated output of the controller K, i.e. $\delta_K$, can exceed the saturation constraint without any risk of instability and loss of performance. The controller K then generates an unsaturated turning angle setpoint $\delta_K$, and not a turning speed setpoint, which takes into account the saturated angle setpoint $\delta_{ref}$ as it appears in the equation Math 6. Thus, the control setpoint $\delta_{ref}$ is a saturated turning angle setpoint of each guiding wheel 11 in that the first derivative of the control setpoint $\dot{\delta}_{ref}$, i.e. the turning speed, is saturated.

The invention claimed is:

1. A control apparatus for autonomously controlling a movement of a motor vehicle that is adapted for driving on roads and that comprises at least one guiding wheel, the control apparatus comprising:
at least one movement that is adapted to influence a trajectory of the control apparatus;
an actuator for controlling the movement; and
a computer for controlling the actuator, wherein the movement corresponds to an ability of each guiding wheel to turn, the computer configured to:
acquire parameters ($\beta$, r, $\Psi_L$, $e_{yL}$, $\delta$, $\delta_{ref}$) relating to the trajectory of the vehicle; and
compute a new control setpoint ($\delta_{ref}$) of the movement of the vehicle as a function of the parameters ($\beta$, r, $\Psi_L$, $e_{yL}$, $\delta$, $\delta_{ref}$) using a closed loop transfer function that models a behavior of the vehicle,
wherein:
the parameter ($\beta$) denotes a drift angle of the vehicle,
the parameter (r) denotes a yaw rate of the vehicle,
the parameter ($\Psi_L$) denotes a relative heading angle between a longitudinal axis along a direction of travel of the vehicle and a tangent line of an avoidance trajectory of the vehicle,
the parameter ($e_{yL}$) denotes a trajectory following error of the vehicle,
the parameter ($\delta$) denotes a measured turning angle, and
the parameter ($\delta_{ref}$) denotes a saturated turning angle setpoint,
wherein the closed loop transfer includes:
a setpoint variation limiter model (T1) for a turning speed of the wheel with an unsaturated turning angle setpoint ($\delta_K$) as input and the saturated turning angle setpoint ($\delta_{ref}$) as output,
a model (T2) which represents a model of the vehicle with the saturated turning angle setpoint ($\delta_{ref}$) and disruptions as input and an output vector as output, and
a state feedback law for calculating the unsaturated turning angle setpoint ($\delta_K$) based on the output vector,
wherein the controller is further configured to determine the new control setpoint ($\delta_{ref}$) in accordance with the setpoint variation limiter model (T1) that limits a variation of the saturated turning angle control setpoint ($\delta_{ref}$).

2. The control apparatus according to claim 1, wherein provision is made for determining an unsaturated setpoint of the steering angle ($\delta_K$) that does not respect a limiting model, and wherein the limiting model comprises a hyperbolic tangent function of the deviation between the unsaturated turning angle setpoint ($\delta_K$) and the saturated turning angle setpoint ($\delta_{ref}$).

3. The control apparatus according to claim 2, wherein provision is made for comparing a value ($\theta$) computed using said hyperbolic tangent function with a predetermined threshold ($\theta_{min}$) and, depending on the result of said comparison, continuing or interrupting a method executed by the computer.

4. The control apparatus according to claim 3, wherein the value ($\theta$) is computed using the mathematical expression:

$$\theta = \frac{\tanh(\alpha(\delta_K - \delta_{ref}))}{\alpha(\delta_K - \delta_{ref})},$$

where $\alpha$ is a predetermined constant;
$\delta_K$ is the unsaturated turning angle setpoint; and
$\delta_{ref}$ is the saturated turning angle setpoint.

5. The method control apparatus according to claim 1, wherein the parameters ($\beta$, r, $\Psi_{PL}$, $e_{yL}$, $\delta$, $\delta_{ref}$) comprise at least one yaw rate (r) of the apparatus and/or a relative heading angle ($\Psi_L$) between the longitudinal axis of the apparatus and a tangent to the trajectory.

6. The control apparatus according to claim 1 formed by a motor vehicle adapted for driving on roads and comprising at least one guiding wheel, wherein the movement corresponds to the ability of each guiding wheel to turn.

* * * * *